(12) United States Patent
Cioffi et al.

(10) Patent No.: US 7,991,122 B2
(45) Date of Patent: Aug. 2, 2011

(54) DSL SYSTEM TRAINING

(75) Inventors: John M. Cioffi, Atherton, CA (US); Wonjong Rhee, Palo Alto, CA (US); Bin Lee, Palo Alto, CA (US); Georgios Ginis, San Francisco, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 1584 days.

(21) Appl. No.: 11/345,215

(22) Filed: Feb. 1, 2006

(65) Prior Publication Data

US 2006/0274893 A1 Dec. 7, 2006

Related U.S. Application Data

(60) Provisional application No. 60/686,544, filed on Jun. 2, 2005, provisional application No. 60/698,113, filed on Jul. 10, 2005.

(51) Int. Cl.
*H04M 1/24* (2006.01)
*H04M 3/08* (2006.01)
*H04M 3/22* (2006.01)

(52) U.S. Cl. .... 379/1.04; 379/24; 379/27.03; 379/29.08

(58) Field of Classification Search .............. 379/1.01, 379/1.03, 1.04, 9, 10.01, 12, 15.03, 22, 22.02, 379/22.05, 22.07, 23, 24, 27.01, 29.01, 27.03, 379/29.08; 370/222

See application file for complete search history.

(56) References Cited

U.S. PATENT DOCUMENTS

| 5,991,311 | A | * | 11/1999 | Long et al. | 370/524 |
| 6,408,033 | B1 | * | 6/2002 | Chow et al. | 375/260 |
| 6,636,603 | B1 | | 10/2003 | Milbrandt | |
| 6,754,186 | B1 | * | 6/2004 | Bullman | 370/282 |

(Continued)

FOREIGN PATENT DOCUMENTS

CN 101461253 6/2009

(Continued)

OTHER PUBLICATIONS

"International Preliminary Report on Patentability and Written Opinion", PCT Application No. PCT/US2007/013393, (Dec. 24, 2008).

(Continued)

*Primary Examiner* — Binh K Tieu
(74) *Attorney, Agent, or Firm* — Blakely Sokoloff Taylor & Zafman LLP

(57) ABSTRACT

Existing and future standardized VDSL2 and other systems can be integrated into and used with a vectored DSLAM or other vectored or non-vectored DSL system, without a new user disrupting service to other users in the same or a nearby binder, in some cases by using transmit power, CARMASK and/or PSDMASK DSL capabilities to reduce both downstream and upstream training-signal levels so that training of a new DSL line is non-disruptive, despite a lack of knowledge of the pre-existing binder. For vectored systems, the crosstalk from that tone can be observed, learned and then added to the vectoring system so that any subsequent excitation on that tone would be eliminated by vector processing. A second tone then can be added in the same way, etc. In non-vectored DSLs that might be operating in a binder or line set, once these non-vectored lines are observed to be present, a vectored line set controller, such as a DSL optimizer, then can anticipate the potential interference from such non-vectored lines.

20 Claims, 7 Drawing Sheets

U.S. PATENT DOCUMENTS

| | | | |
|---|---|---|---|
| 6,804,267 B1 * | 10/2004 | Long et al. | 370/524 |
| 7,103,004 B2 * | 9/2006 | Wang | 370/252 |
| 2002/0094428 A1 | 7/2002 | Nomura et al. | |
| 2002/0176368 A1 * | 11/2002 | Reddy | 370/252 |
| 2003/0108095 A1 * | 6/2003 | Duvaut et al. | 375/222 |
| 2003/0112858 A1 * | 6/2003 | Wang | 375/222 |
| 2003/0117963 A1 * | 6/2003 | Wang | 370/252 |
| 2004/0095921 A1 | 5/2004 | Kerpez | |
| 2005/0129218 A1 | 6/2005 | Kimble et al. | |
| 2006/0029147 A1 | 2/2006 | Tsatsanis | |
| 2006/0029148 A1 | 2/2006 | Tsatsanis | |
| 2006/0039456 A1 * | 2/2006 | Bostoen et al. | 375/222 |
| 2006/0198430 A1 * | 9/2006 | Rhee et al. | 375/222 |
| 2007/0019681 A1 * | 1/2007 | Wang | 370/493 |
| 2009/0207985 A1 | 8/2009 | Cioffi et al. | |

FOREIGN PATENT DOCUMENTS

| | | |
|---|---|---|
| WO | WO-01/35611 | 5/2001 |
| WO | WO 2005/034459 A | 4/2005 |
| WO | WO-2005034459 | 4/2005 |
| WO | WO-2005094052 | 10/2005 |
| WO | WO-2006129140 | 12/2006 |

OTHER PUBLICATIONS

ITU—Telecommunication Standardization Sector, "Physical Layer Management for Digital Subscriber Line (DSL)," Geneva, Switzerland; May 2003; pp. 46-89 XP017401258 (44 pgs).

"International Search Report and Written Opinion", PCT Application No. PCT/US2007/013393, (Jan. 4, 2008).

Ginis, George, et al., "Vectored Transmission for Digital Subscriber Line Systems", *IEEE Journal*, vol. 20 No. 5, Piscataway, NJ, US, XP-011065493, (Jun. 5, 2002), pp. 1085-1104.

International Search Report, International Application No. PCT/IB2006/000645 (4 pgs), Apr. 1, 2009.

Written Opinion of the International Searching Authority, International Application No. PCT/IB2006/000645 (9 pgs), Feb. 12, 2010.

Papandreou et al.. "Real-Time FEXT Crosstalk Identification in ADSL Systems." Intelligent Signal Processing, 2003 IEEE International Symposium; Sep. 4, 2003, XP-10688401 (6 pgs).

Non-Final Office Action for China Patent Application No. 200680024116.2, Mailed Feb. 12, 2010, 9 pages.

Non-Final Office Action for China Application No. 200780021083.0 Mailed Apr. 1, 2010, 6 pages.

European Patent Office, "Examination Report", European Application No. 07795837.9, (Apr. 1, 2009), 4 pages.

Patent Cooperation Treaty, "International Search Report and Written Opinion", PCT Application No. PCT/IB2006/000645, (Aug. 4, 2006, 15 pages.

Office Action for Australian Patent Application No. 2006253892 mailed Feb. 8, 2010, 2 pages.

International Preliminary Report on Patentability for International Patent Application No. PCT/IB2006/000645 mailed Dec. 6, 2007, 10 pages.

Office Action for European Application No. 06710580.9 mailed Aug. 11, 2010, 8 pages.

"Physical Layer Management for Digital Subscriber Line (DSL) Transceivers", International Telecommunication Union, Geneva, CH, May 2003, Ref XP017401258, 74 pages.

Papandreou, et al., "Real Time FEXT Crosstalk Identification in ADSL Systems", IEEE, WISP 2003, Budapest, Hungary, Sep. 4-6, 2003, 6 Pages.

* cited by examiner

DSL SYSTEM TRAINING

CROSS-REFERENCE TO RELATED APPLICATIONS

This application claims the benefit of priority under 35 U.S.C. §119(e) of the following:

U.S. Provisional No. 60/686,544 filed on Jun. 2, 2005, entitled DSL SYSTEM TRAINING, the entire disclosure of which is incorporated herein by reference in its entirety for all purposes.

U.S. Provisional No. 60/698,113 filed on Jul. 10, 2005, entitled DSL SYSTEM, the entire disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to methods, systems and apparatus for managing digital communications systems.

2. Description of Related Art

Digital subscriber line (DSL) technologies provide potentially large bandwidth for digital communication over existing telephone subscriber lines (referred to as loops and/or the copper plant). In particular, DSL systems can adjust to line characteristics by using a discrete multitone (DMT) line code that assigns bits to tones (sub-carriers), which can be adjusted to channel conditions determined during modem training/initialization (e.g., transceivers that function as both transmitters and receivers) at each end of the line.

In DSL systems, crosstalk among the twisted pairs typically reduces and/or limits performance. Significant problems arise already-operating DSL lines when one or more previously unused twisted pairs first activate for DSL operation (or for DSL service upgrade). Such activation can disrupt the already-operating DSL systems when they receive crosstalk caused by the new service(s). In vectored DSL systems, activation of one or more new lines can interfere with the vectored system operation which, prior to new line activation, has been configured to operate in a certain way. Vectored system re-configuration may thus be needed to avoid disrupting strong crosstalk.

Systems, apparatus, methods and techniques that provide improvements for training DSL systems when adding new lines would represent a significant advancement in the art. More specifically, systems, apparatus, methods and techniques for implementing such training for vectored DSL systems likewise would represent a significant advancement in the art.

BRIEF SUMMARY

This invention allows existing and future standardized VDSL2 and other systems to be integrated into and used with a vectored DSLAM or other vectored or non-vectored DSL system, without a new user disrupting service to other users in the same or a nearby binder. Some embodiments of the invention use the existing transmit power, CARMASK and/or PSDMASK capabilities of current, pending and anticipated DSL standards including VDSL2 (or G.997.1 as modified for VDSL2) to reduce both downstream and upstream training-signal levels so that training of a new DSL line is non-disruptive, despite a lack of knowledge of the pre-existing binder.

In one embodiment of the present invention, PSDMASK levels in all or a portion of the frequency band used for training a "new line" (that is, either a line that has never operated before or one for which operational information is missing or lost, also referred to as a "new user") are set sufficiently low upon initial training, and the remaining already-operating lines (likely, but not necessarily in the same binder) are scanned for evidence of a faint but non-disruptive crosstalker (that is, the new line). The crosstalker/new line is assessed (for example, by a DSL Optimizer or controller), and then any vectored and/or non-vectored devices are updated appropriately before the new line is allowed to train at a higher signal level, for example to allow the hew line to achieve a desired data rate. While existing standards (for example, but not limited to, the pending G.993.2 VDSL2 standard of the ITU) do not provide for such polite training, the present invention utilizes the fact that such politeness can instead be compelled via imposition of the PSDMASK (for example, by the service provider and/or a DSL optimizer) before the new line is allowed to train.

The low transmit power level used in some embodiments occasionally might prevent the crosstalk channel from being estimated adequately for proper adjustment of the affected, already-operating lines (usually in the same binder; examples herein discussing lines in the same binder are not limited solely to lines in the same physical binder, but also include lines in close enough proximity to induce crosstalk into one another, etc., as will be appreciated by those skilled in the art). Therefore, according to another embodiment of the present invention, CARMASK or PSDMASK (or any other transmit power and/or spectrum control) can be used to introduce a new line on a tone-by-tone basis into a vectored or non-vectored binder or other line set. That is, only one different tone at a time (on successive restarts) could be turned on by CARMASK, PSDMASK, etc. so that affected, already-operating lines in the same binder can make proper adjustments before the next tone is turned on by the new line. The newly turned-on tone can be allowed to use a high power level because the new crosstalk into other DSL lines causes only a single-tone disturbance on that one tone and can be corrected by the FEC (forward-error correction) systems on those other lines (which can correct at least a byte or two in error corresponding to one tone).

For vectored systems, the crosstalk from that tone could be observed, learned and then added to the vectoring system so that any subsequent excitation on that tone would be eliminated by vector processing. A second tone then can be added in the same way, etc. Using this embodiment, each new user tone can transmit at high levels without disrupting other lines. If more than one tone is excited at once (that is, each training may be for a single tone or for a group or set of tones), then their levels have to be set to cause few or no errors on victim DSLs already in operation. PSDMASK can be used to ensure appropriate levels on those tones—high enough to be seen, but not so high as to cause large numbers of errors in the already-operating lines and/or systems. The PSDMASK settings used in connection with successive trainings of the new line allow the new line's non-invasive introduction into a vectored set (even if the new line's Hlin and Xlin are not yet known). Those line characteristics might instead be determined upon each successive initialization or, in some situations, a single training may be sufficient.

The present invention also addresses non-vectored DSLs that might be operating in the binder or line set. Once these non-vectored lines are observed to be present, a controller (for example, a DSL optimizer) of a vectored line set within the binder then can anticipate the potential interference from such non-vectored lines. As noted above, embodiments of the present invention may be applied to non-vectored lines in a binder. For example, downstream transmissions in a binder of DSL lines emanating from a CO DSLAM receiving crosstalk from a set of lines transmitting downstream from an RT DSLAM can be considered. If a new RT line is added with full power, the RT line might cause serious crosstalk to some of the lines communicating with the CO DSLAM. Embodiments of the polite training method of the present invention can be used to prevent a severe disruption to existing CO lines by a newly transmitting RT line and to determine its effect on existing CO lines. The new RT line may be trained initially at a low transmit power, and any effects of the new RT line on the existing CO lines may be assessed while the RT line causes a small but observable crosstalk to existing CO lines. Subsequently, the PSDMASK or data rate of the new RT line may be properly defined to limit any disturbance to the CO lines to an acceptable level while guaranteeing a proper data rate to the new RT line.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
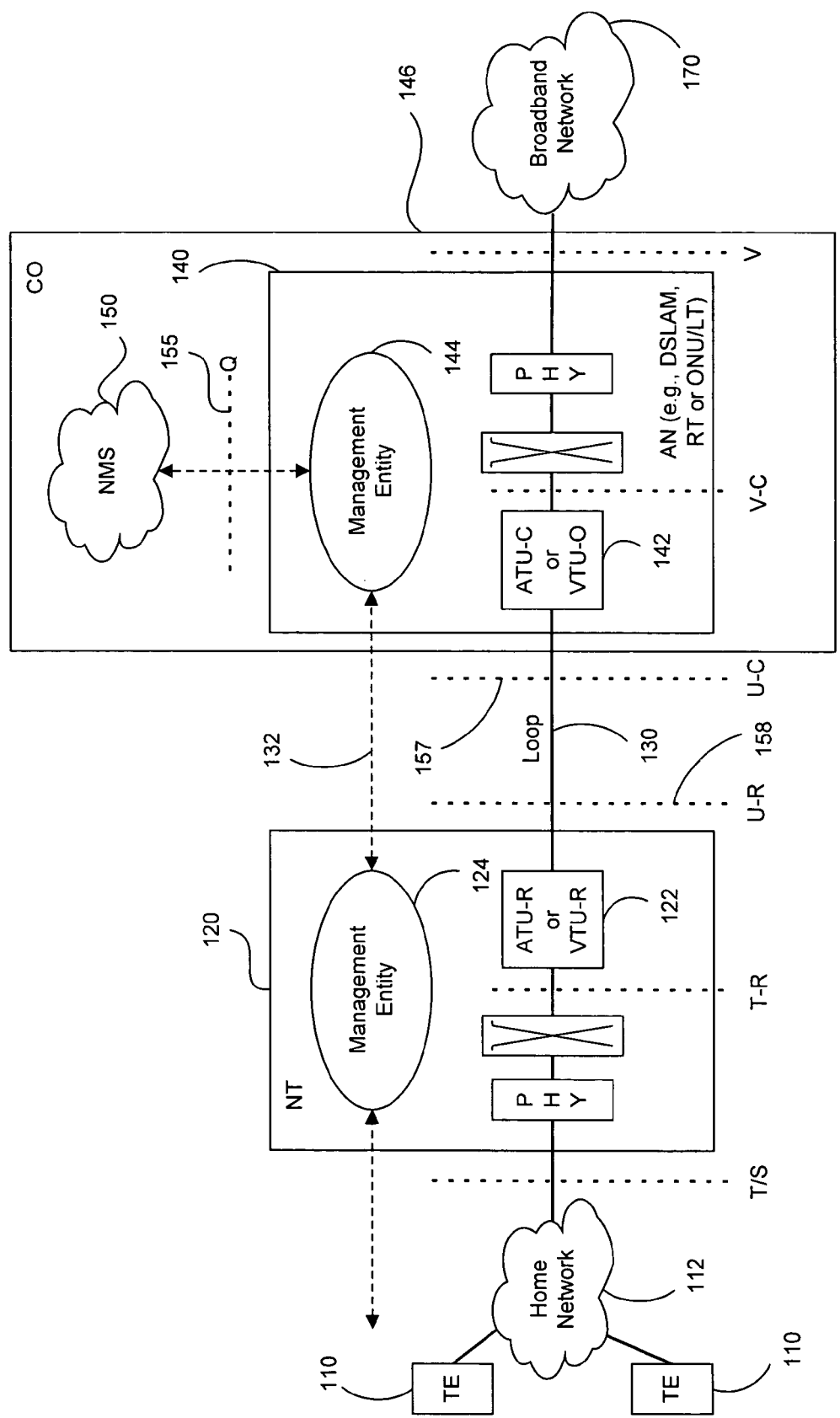
FIG. 1 is a schematic block reference model system per the G.997.1 standard applicable to ADSL, VDSL and other communication systems in which embodiments of the present invention may be used.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Some embodiments of the present invention implement methods and apparatus that permit the non-disruptive introduction of a new DSL line into the operation of a vectored and/or non-vectored DSL system. The communication system in which embodiments of the present invention may be used may include ADSL lines, VDSL lines, and/or other communication system components and/or lines with which the present invention is practical, as will be appreciated by those skilled in the art after reading the present disclosure.

As described in more detail below, a DSL control unit implementing one or more embodiments of the present invention can be part of a controller (for example, in or as a DSL optimizer, dynamic spectrum manager or spectrum management center). The controller and/or DSL control unit can be located anywhere. In some embodiments, the controller and/or DSL control unit reside in a DSL CO, while in other cases they may be operated by a third party located outside the CO. The structure, programming and other specific features of a controller and/or DSL control unit usable in connection with embodiments of the present invention will be apparent to those skilled in the art after reviewing the present disclosure.

A controller, such as a DSL optimizer, dynamic spectrum management center (DSM Center), a "smart" modem and/or computer system can be used to collect and analyze the operational data and/or performance parameter values as described in connection with the various embodiments of the present invention. The controller and/or other components can be a computer-implemented device or combination of devices. In some embodiments, the controller is in a location remote from modems or other communication equipment coupled to a communication line. In other cases, the controller may be collocated with one of or both of the "local" devices (that is, devices directly coupled to a communication line or part of such a local device) as equipment directly connected to a modem, DSLAM or other communication system device, thus creating a "smart" modem. The phrases "coupled to" and "connected to" and the like are used herein to describe a connection between two elements and/or components and are intended to mean coupled either directly together, or indirectly, for example via one or more intervening elements or via a wireless connection, where appropriate.

Some of the following examples of embodiments of the present invention will use vectored ADSL and/or VDSL systems as exemplary communications systems. Within these DSL systems, certain conventions, rules, protocols, etc. may be used to describe operation of the exemplary DSL system and the information and/or data available from customers (also referred to as "users") and/or equipment on the system. However, as will be appreciated by those skilled in the art, embodiments of the present invention may be applied to various communications systems, and the invention is not limited to any particular system.

Various network-management elements are used for management of ADSL and VDSL physical-layer resources, where elements refer to parameters or functions within an ADSL or VDSL modem pair, either collectively or at an individual end. A network-management framework consists of one or more managed nodes, each containing an agent. The managed node could be a router, bridge, switch, modem or other. At least one NMS (Network Management System), which is often called the manager, monitors and controls managed nodes and is usually based on a common PC or other computer. NMS is in some instances also referred to as an Element Management System (EMS). NMS and EMS systems are considered to be parts of Operations Support Systems (OSS). A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which applies to various ADSL and VDSL systems, which is well known to those skilled in the art, and in which embodiments of the present invention can be implemented. This model applies to ADSL and VDSL systems meeting the various standards that may or may not include splitters, such as ADSL1 (G.992.1), ADSL-Lite (G.992.2), ADSL2 (G.992.3), ADSL2-Lite (G.992.4), ADSL2+(G.992.5), VDSL1 (G.993.1) and other G.993.x emerging VDSL standards, as well as the G.991.1 and G.991.2 SHDSL standards, all with and without bonding. These standards, variations thereto, and their use in connection with the G.997.1 standard are all well known to those skilled in the art.

The G.997.1 standard specifies the physical layer management for ADSL and VDSL transmission systems based on the clear embedded operation channel (EOC) defined in G.997.1 and use of indicator bits and EOC messages defined in G.99x standards. Moreover, G.997.1 specifies network management elements content for configuration, fault and performance management. In performing these functions, the system utilizes a variety of operational data that are available at and can be collected from an access node (AN). The DSL Forum's TR69 report also lists the MIB and how it might be accessed. In FIG. 1, customers' terminal equipment 110 is coupled to a home network 112, which in turn is coupled to a network termination unit (NT) 120. In the case of an ADSL system, NT 120 includes an ATU-R 122 (for example, a modem, also referred to as a transceiver in some cases, defined by one of the ADSL and/or VDSL standards) or any other suitable network termination modem, transceiver or other communication unit. The remote device in a VDSL system would be a VTU-R. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other upstream and/or central location. In a VDSL system, each VTU-R in a system is coupled to a VTU-O in a CO or other upstream and/or central location (for example, any line termination device such as an ONU/LT, DSLAM, RT, etc.). In this invention, such VTU-O's (or equivalents) are coordinated in terms of transmission (downstream) and reception (upstream) of all or many of the lines terminating on the termination device. Such coordinated transmission reception constitutes a vectored line-termination device. In FIG. 1, ATU-C 142 is located at an access node (AN) 140 in a CO 146. AN 140 may be a DSL system component, such as a DSLAM, ONU/LT, RT or the like, as will be appreciated by those skilled in the art. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL (and VDSL) typically is a telephone twisted pair that also carries other communication services.

Several of the interfaces shown in FIG. 1 can be used for determining and collecting operational and/or performance data. To the extent the interfaces in FIG. 1 differ from another ADSL and/or VDSL system interface scheme, the systems are well known and the differences are known and apparent to those skilled in the art. The Q-interface 155 provides the interface between the NMS 150 of the operator and ME 144 in AN 140. All the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 124 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130; Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in DSL Forum Technical Report TR-005, entitled "ADSL Network Element Management" from the ADSL Forum, dated March 1998. Also, DSL Forum Technical Report TR-069, entitled "CPE WAN Management Protocol," dated May 2004. Finally, DSL Forum Technical Report TR-064, entitled "LAN-Side DSL CPE Configuration Specification," dated May 2004. These documents address different situations for CPE side management and the information therein is well known to those skilled in the art. More information about VDSL can be found in the ITU standard G.993.1 (sometimes called "VDSL1") and the emerging ITU standard G.993.2 (sometimes called "VDSL2"), as well as several DSL Forum working texts in progress, all of which are known to those skilled in the art. For example, additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) as well as in the emerging revision of ITU standard G.997.1 for VDSL1 and VDSL2 MIB elements, or in the ATIS North American Draft Dynamic Spectrum Management Report, NIPP-NAI-2005-031.

It is less common for lines sharing the same binder to terminate on the same line card in ADSL, than it is in VDSL. However, the following discussion of xDSL systems may be extended to ADSL because common termination of same-binder lines might also be done (especially in a newer DSLAM that handles both ADSL and VDSL). In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
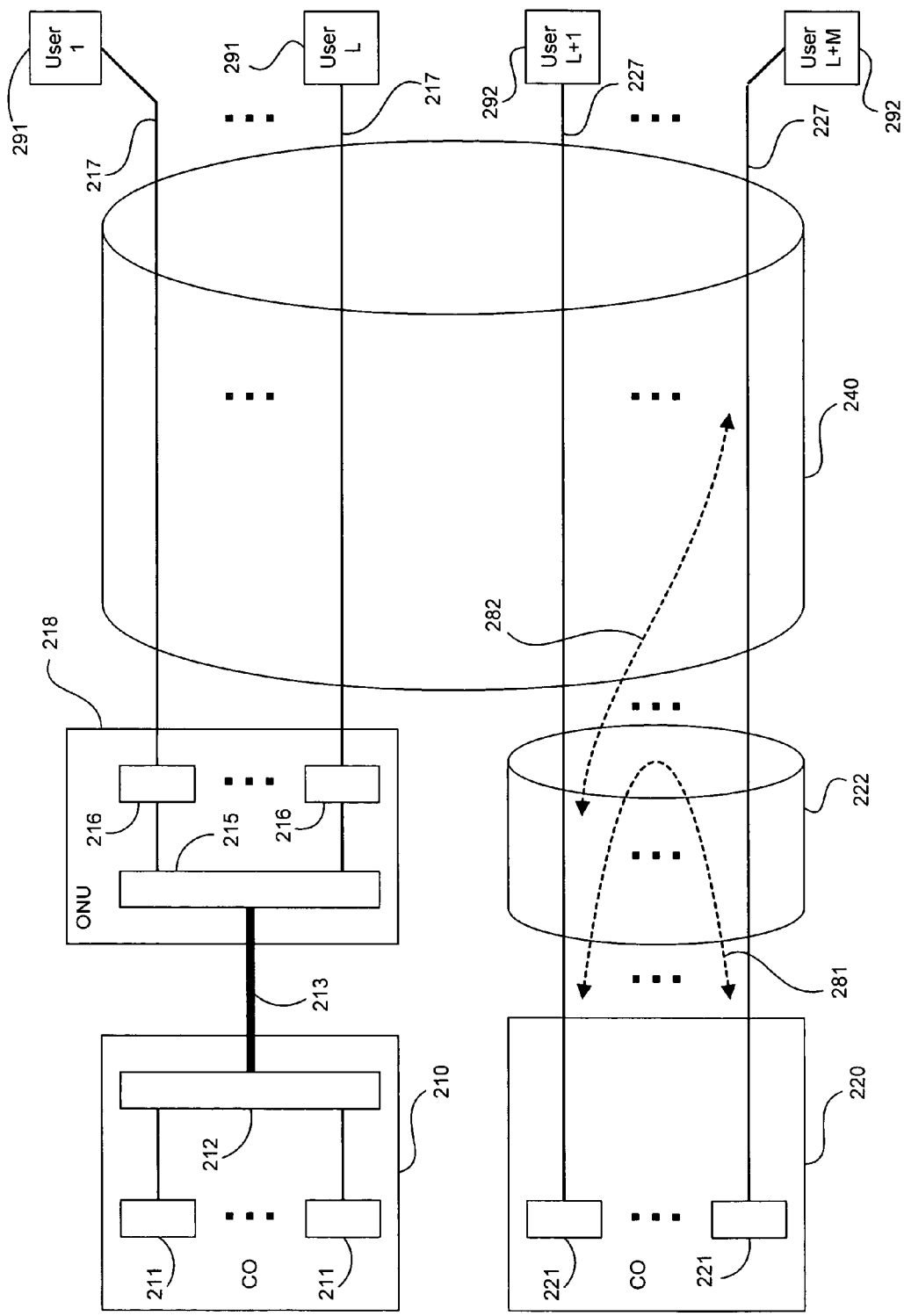
FIG. 2 is a schematic diagram illustrating generic, exemplary DSL deployment.

A generic, exemplary DSL deployment scenario is shown in FIG. 2. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 2, L customers or users 291 are connected to CO 210 using a combination of optical fiber 213 and twisted copper pairs 217, which is commonly referred to as Fiber to the Cabinet (FTT-Cab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

Users' lines that co-terminate in locations such as COs 210, 218 and ONU 220 (as well as others) may be operated in a coordinated fashion, such as vectoring. In vectored communication systems (such as vectored ADSL and/or VDSL systems), coordination of signals and processing can be achieved. Downstream vectoring occurs when multiple lines' transmit signals from a DSLAM or LT are co-generated with a common clock and processor. In VDSL systems with such a common clock, the crosstalk between users occurs separately for each tone. Thus each of the downstream tones for many users can be independently generated by a common vector transmitter. Similarly, upstream vectoring occurs when a common clock and processor are used to co-receive multiple lines' signals. In VDSL systems with such a common clock, the crosstalk between users occurs separately for each tone. Thus each of the upstream tones for many users can be independently processed by a common vector receiver.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from CO 220 to users 292 share binder 222, which is not used by the lines between CO 210 and users 291. Moreover, another binder 240 is common to all the lines to/from CO 210 and CO 220 and their respective users 291, 292. In FIG. 2, far end crosstalk (FEXT) 282 and near end crosstalk (NEXT) 281 are illustrated as affecting at least two of the lines 227 collocated at CO 220.

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from a DSL NMS can be found therein; others may be known to those skilled in the art.

VDSL standards (including the existing G.993.1 VDSL1 and the emerging G.993.2 VDSL2 ITU standards) have made minimal provision for training of vectored lines and/or systems, other than providing means for all lines to use the same effective symbol clock and centralized control of the "timing advance." This coordination of symbol clock and timing advance causes the interference among so-synchronized lines to occur independently on each and every tone (without interference from one tone of one user to any other tone of another user)—that is, each tone is independently modeled for all vectored lines as a matrix of signal flows from inputs on the particular tone to line outputs only on that same tone. The matrices for other tones are similar in structure but are independent. Thus, there is no crosstalk from tone n to tone m where n≠m.

A binder or other set of vectored DSL lines typically performs as if there is no crosstalk between the vectored lines when best methods for vectoring are used and all lines are excited differentially (for example, when no phantom-mode signals are used). In fact, when the non-crosstalk noise is spatially correlated in an upstream direction, the performance often is even better than when there is no crosstalk because the spatial correlation of the noise can be used to reduce its impact. Thus, all lines can run significantly faster. A new noise source, once observed, will reduce vectored systems' assigned data rates (or margins at given data rates). However, if that new noise source is a new line (for example, a previously unobserved DSL), that new line can be incorporated in the binder vectoring without penalty to the already-operating lines after properly adjusting matrices used for vectoring to reflect the new line. A new DSL system (for example, a single new line or a small set of new lines that are bonded or are being retrained simultaneously after a power failure at an ONU) that is capable of vectoring needs to be evaluated regarding its effect on other, already-operating vectored lines so that the new DSL system can be included in the vectored system. Vectoring in both upstream and downstream directions requires the knowledge of the crosstalk insertion-loss functions and the noise power and the correlations to the noise of other vectored lines so that ordering and cancellation (that is, vectoring) can be implemented.

Non-cooperative lines (that is, lines not part of the vectored set or system) can presumably have their spectra limited by the PSDMASK capability (for example, to very low levels in bands where they otherwise would create strong disruption), as will be appreciated by those skilled in the art. However, earlier systems and techniques have failed to recognize that training new, cooperative lines can be controlled by limiting or otherwise controlling the PSD of the new lines. Controlling the PSD of the new lines may be achieved by setting one or more of the following—the PSD mask (PSDMASK), the maximum allowed transmitter power (MAXNOMATP), the maximum PSD level (MAXNOMPSD), the maximum received power (MAXRXPWR), the carrier mask (CARMASK), or the RFI bands (RFIBANDS). Each of these parameters is well known to those skilled in the art and is found in one or more standards applicable to systems that can use embodiments of the present invention.

Control of the PSD may also be achieved indirectly by appropriately programming the maximum allowed SNR margin (SNRM), or the maximum allowed data rate (Rmax), or the maximum number of bits on a tone (BCAP[n]). These parameters, too, are well known to those skilled in the art and are found in one or more standards applicable to systems that can use embodiments of the present invention. Embodiments of the present invention use such controlled PSDs to implement a polite training and introduction of new lines to existing DSL systems. Exemplary embodiments of the current invention are provided herein illustrating identification of downstream and upstream channel and noise information of new lines.

A special solution exists for downstream: As noted above, a new line can transmit with a low PSD level until the downstream insertion loss and corresponding downstream crosstalk functions have been determined. A new cooperative line can be controlled by the CO-side modem and, furthermore, the early measurement of upstream-end NEXT transfer functions by the CO modem can augment the early measurement of a downstream insertion loss to obtain all knowledge necessary for downstream vector channels and for vectoring matrices.

A downstream line can transmit at a low PSD level until the downstream insertion loss and corresponding downstream crosstalk functions have been determined. The "line ID" techniques of previous systems, where downstream vector channels are explicitly measured using vector-channel training that requires interruption of services to all the lines involved during and/or affected by training, are completely unnecessary in view of above-referenced method. The downstream crosstalk/insertion loss matrix can be based on upstream-end NEXT, measured earlier, and the earliest reported insertion loss of channel discovery. Various methods exist for obtaining the relationships between crosstalk sources and their victims. One method records the reported noise (or SNR or margins) on lines already in service within a binder when a new service/line energizes with a lower power level. Small changes immediately succeeding such energization allow computation of the effective transfer between lines for the purposes of successive PSD setting of all lines. Further, for vectored systems, the ATIS DSM Report lists an Xlin[n] parameter that must be reported by DSM-capable modems when in operation. Such an Xlin can be used to update the FEXT crosstalk descriptions for a vector channel. After the vector channel information of the new line is determined, the vector system can be properly adjusted so that the new line does not cause any disruption to existing lines (even when a high power level is used by the new line).

Training of a new line in an upstream direction is explained as an exemplary embodiment below. More general solutions can be used for both upstream and downstream transmission directions, as will be apparent to those skilled in the art after reviewing the present disclosure. In some embodiments of the invention, upstream transmission of the new line is initially allowed at a low power level. Existing vectored upstream receivers may monitor all "error" signals continuously. Error signals can be defined to be the difference between an instantaneous decision on the output of the FFT/FEQ in a receiver (or GDFE decision element, if present) and the output of the decision device, for example denoted by $E_{u,n}$ for the $n^{th}$ tone of the $u^{th}$ user. In stationary operation, this noise is small. With a new DSL transmitting, this signal will increase on all the tones of users who experience significant crosstalk coupling from the new DSL user. This crosstalk can be exploited in various ways to estimate the upstream vector channel, and an exemplary method is discussed below.

A cooperative transmitter (for example, a transmitter using vectoring and/or other technologies available from Adaptive Spectrum and Signal Alignment, Inc. of Redwood City, Calif.), can place a known 4-point QAM signal, $T_n$, at very low signal power levels on one or more tones (including cases where it is placed on all tones) that the transmitter may subsequently use. The low transmit power level(s) may be restricted to a specific set of used tones, for example by using either the PSDMASK or CARMASK DSL parameter, thus limiting the interference so that it is either small enough to be non-disruptive, or so limited in frequency extent that FEC measures on the other ("victim") lines renders their operation insensitive to the newly introduced user.

This signal $T_n$ can be known to the vector receiver and cooperative transmitter. For example, the signal can be one of the known standardized signals used in DSL training as limited by any applicable PSDMASK or CARMASK settings. Moreover, the training sequence can be designed to distinguish sequences for different users (and/or distinct scramblers can be used by different users). The signal also can be inserted by infrequently replacing DMT symbols and inserting distinct training sequences for different users. The signal can be used for tracking the upstream channel as well. In case a known QAM signal is not available, blind estimation methods can be used where a decoded bit stream $T_n$ of the transmitter is used instead of the known training signal $T_n$. In some systems, pilots may be used for channel estimation and tracking in DSL, and the pilot sequence may be used as. $T_n$. In such cases, a pilot can be either assigned to each user, each transmit chain or both. Pilots are like training sequences, but for only some (or one) of the tones at a time.

When upstream signal errors are large, then the calculation $$\hat{X}_{u,n} = \frac{1}{L}\sum_{l=1}^{L} \frac{E_{u,n}(l)}{T_n(l)} \quad \text{Equation (1)}$$

averaged over a significant number of symbols (for example, L=40 or more) will be non-zero only if the new line has significant crosstalk into the line u on tone n. Another method to determine X is simply to use the values reported in any DSM-capable modem as described in the ATIS DSM Report. Furthermore, $\hat{X}_{u,n}$ will be the transfer function term needed to construct the matrix $H_n$ used for vectoring. After estimating the vector channel, the vector system can be properly adjusted so that the new line does not cause any disruption to existing lines, even when a high level of power is used. A non-cooperative DSL might produce a larger error $|E_{u,n}(l)|$, but a zero $\hat{X}_{u,n}$, because the signal from the non-cooperative DSL line will be uncorrelated with $T_n(l)$. The non-cooperative crosstalker may thereafter be treated as noise. The set of tones on which Equation (1) is executed can be relatively small (or large), depending on existing knowledge of the binder and any applicable reliability constraints.

For vectored VDSL, the results on crosstalk channel estimation may be used to identify the user and tone indices that have sufficiently large crosstalk channel gains (for example, meaning large enough to need to be included in vectored calculations and processing), and the channel estimation and tracking thereafter may be chosen to reduce the complexity of the implementation.

While a new line is politely transmitting at low power, the vector channel needs to be identified (for example, the crosstalk channel from the new line to an existing line). For channel identification, any estimation methods can be used, as will be appreciated by those skilled in the art. One well-known method is transmitting known training signals from the new line and using correlation at the receivers of the existing lines. From each receiver, the known training signals may be correlated with the received signal to find the crosstalk channel. Because the crosstalk channel is being sought, the error signal may be considered as a more direct indication of the presence of crosstalk instead of the received signal level itself. The error signal contains only background noise and the crosstalk signal, and thus a simple correlation method can be used if the training signal from the new line is known. As will be appreciated by those skilled in the art, correlation methods sum the products of an error signal and a known training sequence and compare this to a threshold. If the sum of products exceeds this threshold, it is an indication of high correlation and the crosstalker being evident in the error signal. Correlation is used to detect a possible presence of a crosstalker—once detected, then Equation (1) can be used to compute Xlin.

If there is no known training signal, the decoded signal of the new line's signal can be assumed to be correct and used instead of a distinct training signal. Essentially, the decided sequence replaces the known training sequence (if any errors occur, those errors degrade the performance of the estimator so a larger value of L may be needed in Equation 1. Of course the new line's signal needs to be made available to the existing lines' receivers, but that is presumed easy because all those lines are co-located in the common vectoring receiver that makes all the decisions.

In some embodiments of the present invention, where simultaneous training of new lines is desired, various orthogonal training sequences can be used on different lines being simultaneously and politely trained. Such orthogonal sequences may be known to those skilled in the art. Moreover, standardized training procedures can be used in connection with embodiments of the present invention. These standardized procedures may be used in connection with "scanning" of lines, where multiple implementations of sets of operational parameters can be used to learn information about the new lines and their potential integration into an existing DSL line set (for example, a vectored group). In such cases, special limits can be imposed on their use (for example, by imposing operational constraints using PSDMASK, CARMASK, etc.). To enhance the accuracy of measurements, estimates, etc. diverse operational data may be collected by selecting various operational modes (that is, by scanning). In some embodiments, scanning is used wherein a number of line profiles are used in connection with one or more DSL loops having known or unknown configurations, so that a database or library of loop configuration information can be assembled or so that information (for example, regarding new DSL line set operational characteristics) can be learned.

In summary, using embodiments and aspects of the present invention, initial low-level upstream training can be used to identify, in a non-disruptive manner, the crosstalking levels of previously unmeasured but vectored lines. Training can continue with cooperative systems using PSDMASK and/or CARMASK values/parameters to control only transmit power level(s) or to control both power level(s) and selection of tones. By using at least some of these same techniques and/or apparatus, it is possible to recognize which line(s) is/are not cooperative (that is, not part of the same vectored group) and then subsequently treat any non-cooperative line(s) as noise. This treatment of non-cooperative DSL lines can include use of PSDMASK and/or CARMASK to move all or part of non-cooperative systems' upstream and/or downstream transmissions to alternate tones not used by vectored lines.

DSL vector channel estimation can use distinct training sequences or decoded bits (for example, blind estimation) of different users. Also, certain users' transmit power levels might be set to zero so that channels from other users' transmitters can be estimated more easily. A training sequence can be embedded as overhead, embedded by robbing payload bits or be part of an applicable and/or useful DSL standard.

After sufficient information has been developed and evaluated about a given binder's operation and behavior, embodiments of the present invention permit adaptively moving users in and out of a vectored system, for example as instructed by a controller such as a DSL optimizer. In some cases, for example, the order of users' signal processing can be changed by commanding swapping as the training according to the present invention proceeds.

In another embodiment of current invention, a single tone or a small number of tones of a new line may be allowed to transmit at a high power level rather than a large number of tones (or all the tones) being allowed at a low power level. The tone set may be controlled through operational parameters such as CARMASK, PSDMASK, RFIBANDS, and/or BCAP[n]. The high power tones of the new line might cause serious crosstalk to other existing vector lines until becoming part of vectoring, but the FEC of existing lines can be set properly to correct the small number of errors that are caused by the potentially high-power crosstalk from the new line's small number of tones. In this way, the vector channel can be estimated for the tone(s), and the tone(s) can be included as part of vectoring system. After becoming part of vector system, any new line's tones do not cause crosstalk to other already-operating lines that are part of vectoring. Therefore, the method may proceed to next tone(s) whose vector channel is not identified. By continuing the method to the last usable tone, all the tones can become part of vectoring without causing serious disruption to already-operating lines.

The present invention also can be applied to non-vectored lines in a binder or other line set. For instance, downstream transmissions in a binder of DSL lines emanating from a CO DSLAM and crosstalking into a set of downstream lines emanating from an RT DSLAM can be considered. When a new RT line is added, polite training according to embodiments of the present invention can be used to prevent severe disruption to existing CO lines and to determine the new line's effect on existing CO lines. Subsequently, the PSDMASK or data rate of the new RT line may be properly defined to limit any disturbance to the CO lines to an acceptable level while guaranteeing a proper data rate to the new RT line. Also, the proper power and rate settings can be determined for the RT line and the CO lines to achieve the most desired rate tuple.

Various apparatus according to the present invention can implement one or more of the methods and/or techniques discussed above. According to one embodiment of the present invention shown in FIG. 3A, a DSL control unit 300 (which may be responsible for vectored line training, as well as GDFE, precoding, ordering, channel and crosstalk detection and evaluation, etc. in some embodiments of the present invention) may be part of an independent entity coupled to a DSL system, such as a controller 310 (for example, a device functioning as or with a DSL optimizer, DSM server, DSM Center or a dynamic spectrum manager) assisting users and/or one or more system operators or providers in operating and, perhaps, optimizing use of the system. (A controller or DSL optimizer may also be referred to as a DSM server, dynamic spectrum manager, Dynamic Spectrum Management Center, DSM Center, Spectrum Maintenance Center or SMC.) In some embodiments, the controller 300 may be an independent entity, while in other embodiments the controller 300 can be an ILEC or CLEC operating a number of DSL lines from a CO or other location. As seen from the dashed line 346 in FIG. 3A, the controller 300 may be in the CO 146 or may be external and independent of CO 146 and any company operating within the system. Moreover, controller 300 may be coupled to and/or controlling DSL and/or other communication lines in multiple COs. In some embodiments of the present invention, the controller 310 controls a vectored DSL system in a specific binder. The DSL lines in the binder may be ADSL, VDSL and/or other communication lines in various combinations.

The DSL control unit 300 has access (directly or indirectly) to information and/or data regarding the various lines in the subject binder and can control certain aspects of those lines' operation. This control may include controlling parameters that are specific to vectored systems (for example, tonal GDFE receiver parameters for upstream signal processing, tonal precoding parameters for downstream signal processing, ordering of users in precoding and/or decoding, parameters for training/tracking signals, etc.) as well as parameters that are common to both non-vectored and vectored systems (for example, PSD parameters, PSDMASK parameters, CARMASK parameters, TSNRM parameters, MAXSNRM parameters, data rate parameters, etc.).

Figure 3A:
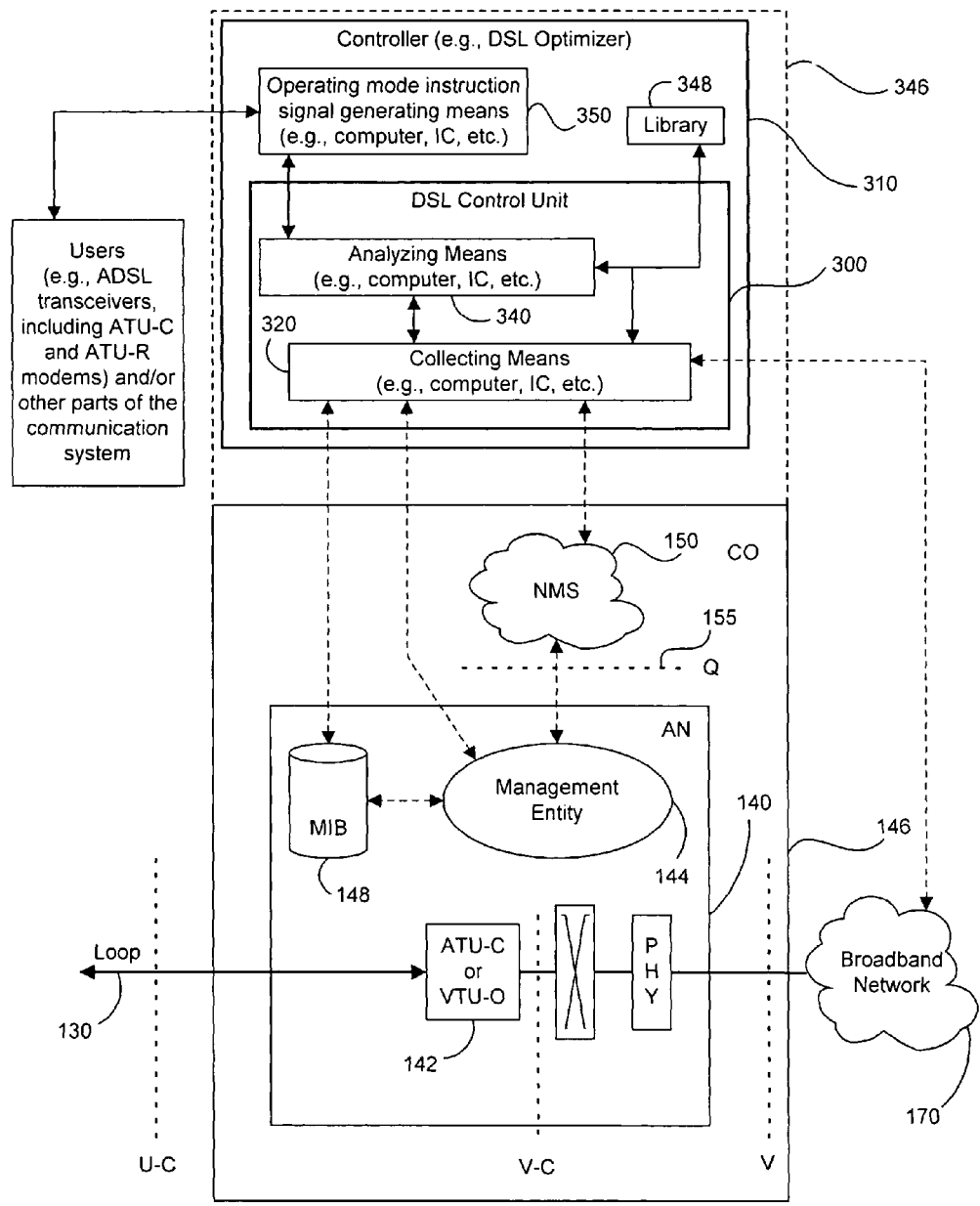
FIG. 3A is a controller including a DSL control unit according to one embodiment of the present invention.

The DSL control unit 300 includes a data collection unit 320 identified as a collecting means and an analysis unit 340 identified as analyzing means. As seen in FIG. 3A, the collecting means 320 (which can be a computer, processor, IC, computer module, etc. of the type generally known) may be coupled to NMS 150, ME 144 at AN 140 and/or the MIB 148 maintained by ME 144, any or all of which may be part of an ADSL and/or VDSL system for example. Data also may be collected through the broadband network 170 (for example, via the TCP/IP protocol or other protocol or means outside the normal internal data communication within a given DSL system). One or more of these connections allows the DSL control unit to collect operational data from the system. Data may be collected once or over time. In some cases, the collecting means 320 will collect on a periodic basis, though it also can collect data on-demand or any other non-periodic basis (for example, when a DSLAM or other component sends data to the state transition control unit), thus allowing the DSL control unit 300 to update its information, operation, etc., if desired. Data collected by means 320 is provided to the analyzing means 340 (which also can be a computer, processor, IC, computer module, etc. of the type generally known) for analysis and any decision regarding operation of a new DSL line, any vectored lines in the new line's binder and, possibly, any non-vectored, non-cooperative and/or "rogue" communication lines in the binder (or anywhere else that might affect performance of the vectored system). Moreover, analysis may include evaluating data for other purposes contemplated by other embodiments of the present invention, as will be appreciated by those skilled in the art.

In the exemplary system of FIG. 3A, the analyzing means 340 is coupled to a DSLAM, modem and/or system operating signal generating means 350 (which can be a computer, processor, IC, computer module, etc. of the type generally known) inside or outside the controller 310. This signal generator 350 is configured to generate and send instruction signals to modems and/or other components of the communication system (for example, ADSL and/or VDSL transceivers and/or other equipment, components, etc. in the system). These instructions may include commands limiting or otherwise controlling parameters that are specific to vectored systems (for example, tonal GDFE receiver parameters for upstream signal processing, tonal precoding parameters for downstream signal processing, ordering of users in precoding and/or decoding, parameters for training/tracking signals, etc.) as well as parameters that are common to both non-vectored and vectored systems (for example, PSD parameters, PSDMASK parameters, CARMASK parameters, TSNRM parameters, MAXSNRM parameters, data rate parameters, etc. and/or any other operational characteristics of the relevant communication lines). The instructions may be generated after the controller 310 determines the compatibility of a new line's operation with regard to one or more loops in the communication system, especially a vectored system operating near the new DSL line.

Embodiments of the present invention can utilize a database, library or other collection of data pertaining to the data collected, past operation of the vectored DSL system, the new VDSL line and any other relevant lines and equipment. This collection of reference data may be stored, for example, as a library 348 in the controller 310 of FIG. 3A and used by the analyzing means 340 and/or collecting means 320.

In various embodiments of the invention, the DSL control unit 300 (which can be used for, but is not limited to, vector training and binder/line characteristic identification) may be implemented in one or more computers such as PCs, workstations or the like. The collecting means 320 and analyzing means 340 may be software modules, hardware modules or a combination of both, as will be appreciated by those skilled in the art. When working with a large numbers of modems, databases may be introduced and used to manage the volume of data collected.

Figure 3B:
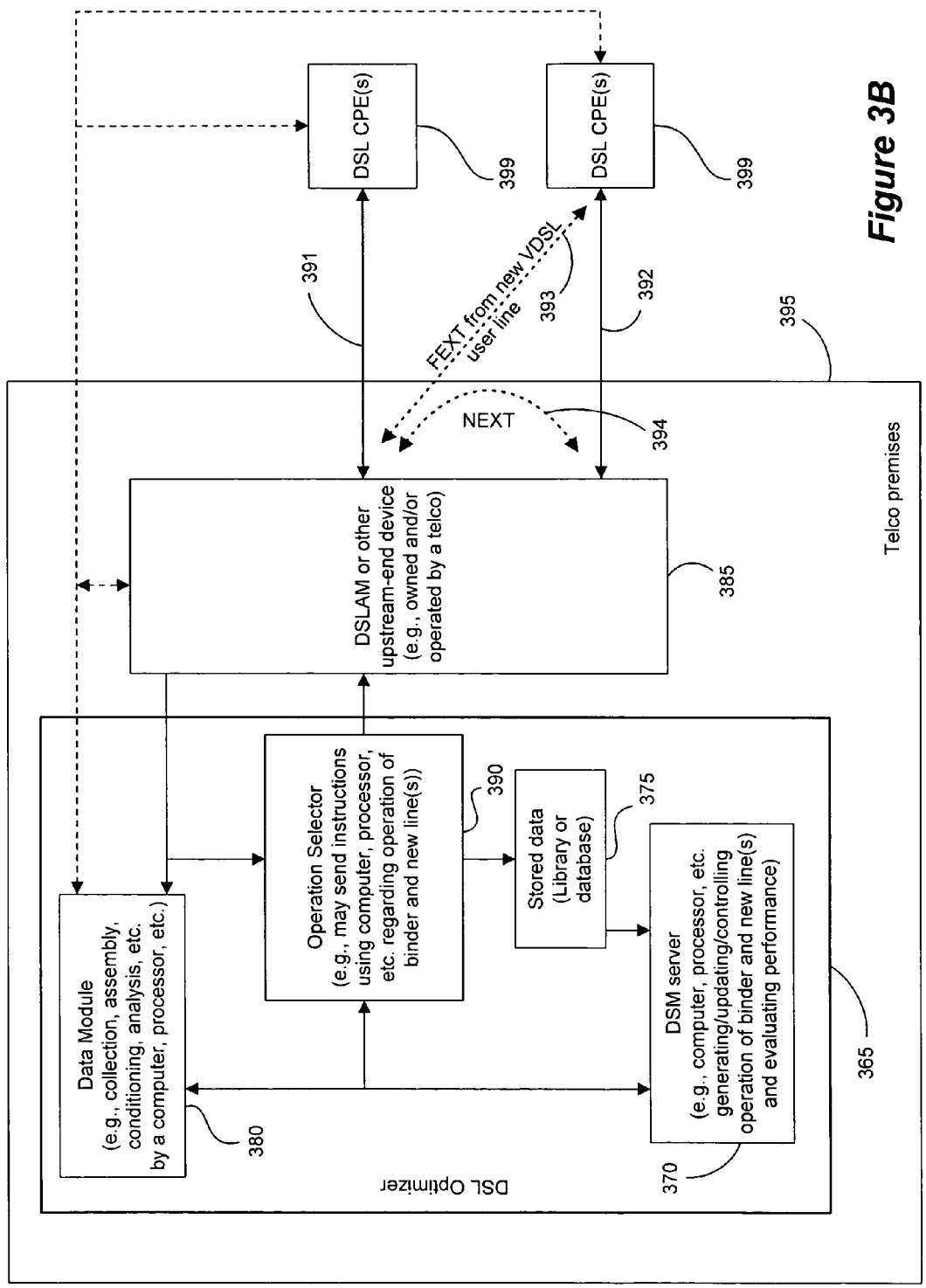
FIG. 3B is a DSL optimizer according to one embodiment of the present invention.

Another embodiment of the present invention is shown in FIG. 3B. A DSL optimizer 365 operates on and/or in connection with a DSLAM 385 or other DSL system component (for example, an RT, ONU/LT, etc.), either or both of which may be on the premises 395 of a telecommunication company (a "telco"). The DSL optimizer 365 includes a data module 380, which can collect, assemble, condition, manipulate and/or supply operational data for and to the DSL optimizer 365. Module 380 can be implemented in one or more computers such as PCs or the like. Data from module 380 is supplied to a DSM server module 370 for analysis (for example, evaluating an appropriate training operation for a new VDSL line, evaluating that new line's impact on a vectored system near the new line, calculating GDFE parameters for upstream, calculating precoding parameters for downstream, deciding the ordering of users, utilizing pilots and other techniques and equipment, etc.). Information also may be available from a library or database 375 that may be related or unrelated to the telco.

An operation selector 390 may be used to implement, modify and/or cease DSL and/or other communication operations, including implementation of various operational parameters involving transmit power, carrier masks, etc. Such decisions may be made by the DSM server 370 or by any other suitable manner, as will be appreciated by those skilled in the art. Operational modes and/or parameters selected by selector 390 are implemented in the DSLAM 385 and/or any other appropriate DSL system component equipment. Such equipment may be coupled to DSL equipment such as customer premises equipment 399. In the case of the introduction of a new VDSL line into a binder in which a vectored system and/or other communication lines are operating, the DSLAM 385 can be used to implement signal and other controls of the type discussed herein within and/or between various lines. For example, a new VDSL line 392 may be trained and evaluated as it relates to one or more existing lines 391 and/or a vectored system, including the impact that the new VDSL line 392 is likely to have in terms of FEXT 393 and NEXT 394 that impacts performance of line(s) 391. The system of FIG. 3B can operate in ways analogous to the system of FIG. 3A, as will be appreciated by those skilled in the art, though differences are achievable while still implementing embodiments of the present invention.

Figure 4:
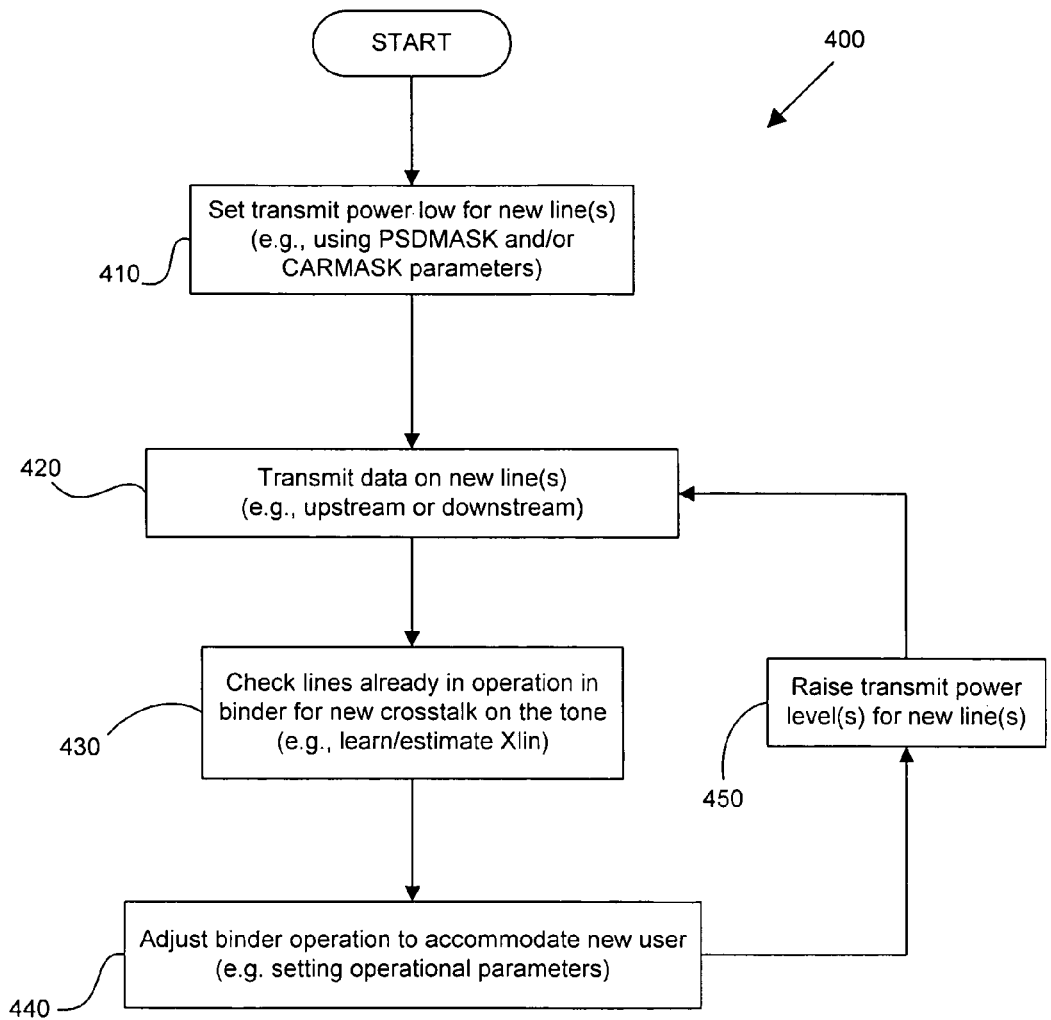
FIG. 4 is a flow diagram illustrating one or more embodiments of the present invention.

A method 400 according to one or more embodiments of the present invention is shown in FIG. 4. At 410 the transmit power of a DSL line set (which may be one or more DSL lines) is set low enough to be non-disruptive to a vectored line set already operating in the same vicinity (for example, the same binder). The transmit power of the new line set can be controlled using various operating parameters (for example, the PSDMASK and/or CARMASK parameters). Optionally, operational parameters of the lines already in operation (for example, data rate or impulse noise protection) may be adjusted to increase the crosstalk immunity of the lines already in operation. Data is transmitted by the new line set at 420, after which the line(s) already in operation (for example, vectored lines) check at 430 for new crosstalk that can be traced to and/or identified with the new line set (for example, by learning and/or estimating Xlin). Transmission may be in either an upstream or downstream direction. Operation can be adjusted at 440 to accommodate, integrate, etc. the new line set (for example, by setting various operational parameters for the vectored line set and/or new line set). When training is done for downstream transmission, the information learned can be used to configure preceding, rotors used to implement certain data processing techniques, etc. When training is done for upstream transmission, the information learned can be used in implementing a tonal predictive GDFE, etc. At 450 the transmit power of one or more lines of the "new" line set can be raised (for example, to another testing level or to full operational level). Data again can be transmitted by the new line set at 420 to either re-evaluate crosstalk effects or to begin normal operation.

Figure 5:
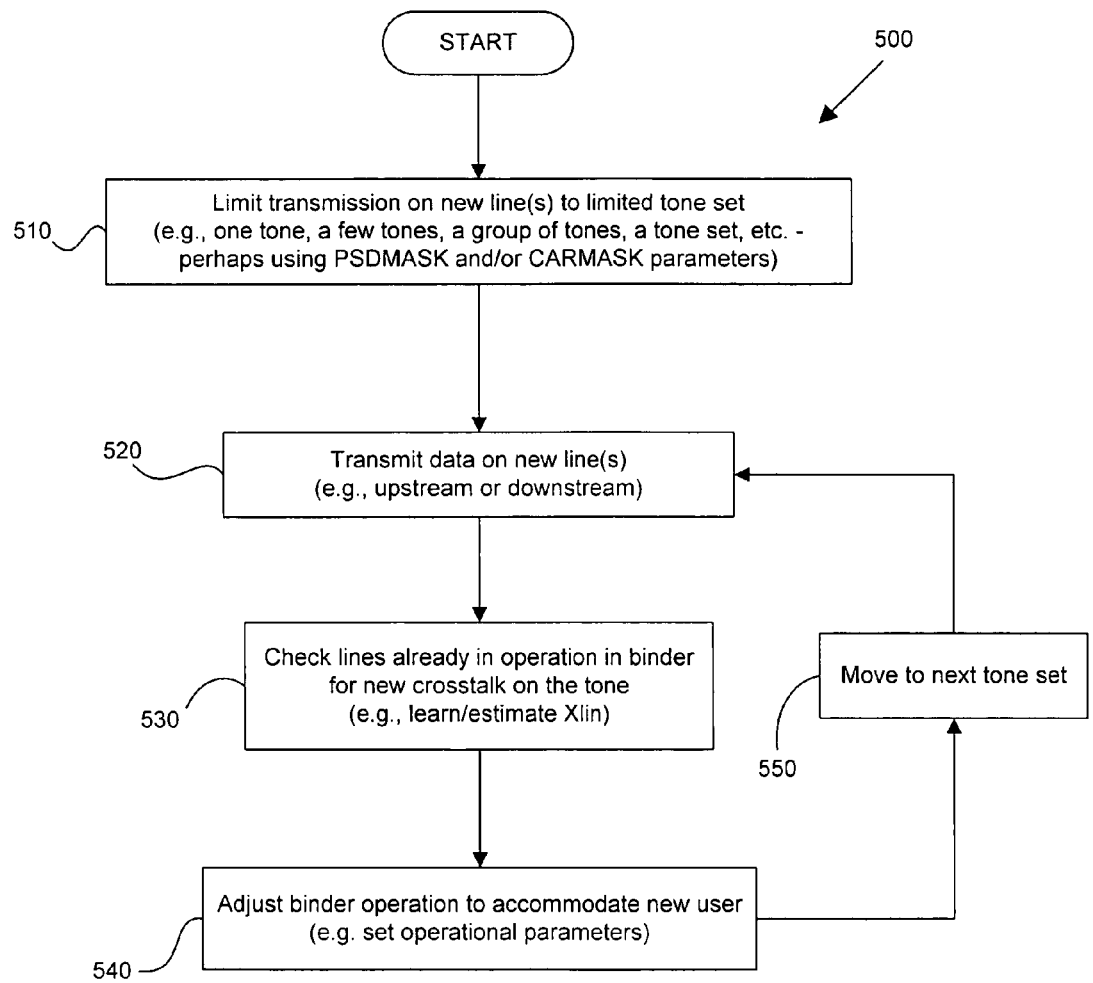
FIG. 5 is another flow diagram illustrating one or more embodiments of the present invention.

Another method 500 according to an embodiment of the present invention is shown in FIG. 5. At 510 data transmission by a new line set (for example, non-vectored lines and/or lines not yet in operation) is limited to a single tone or other tone set. Power does not necessarily have to be limited in this embodiment because FEC measures on the vectored line set typically can address the relatively minor noise effects caused by one or several new crosstalkers on a single tone or frequency. Optionally, operational parameters of the lines already in operation (for example, data rate or impulse noise protection) may be adjusted to increase the crosstalk immunity of the lines already in operation. At 520 the new line set transmits data using the single tone and the effects are checked at 530 in the lines already in operation (for example, a vectored line set). Again, the crosstalk that is learned can include, for example, learning and/or estimating Xlin (for example, using the technique involving Equation (1), above). At 540 the operation of the vectored set, new line set, etc. can be adjusted to accommodate, integrate, etc. the new line set. Once this is done, the new line set can be moved at 550 to a new single tone or other tone set for evaluation, if desired. As will be appreciated by one skilled in the art, and as indicated in FIG. 5, a tone set may be a single tone, several tones, a group of tones, etc. and the entire process of FIG. 5 is still applicable.

Generally, embodiments of the present invention employ various processes involving data stored in or transferred through one or more computer systems, which may be a single computer, multiple computers and/or a combination of computers (any and all of which may be referred to interchangeably herein as a "computer" and/or a "computer system"). Embodiments of the present invention also relate to a hardware device or other apparatus for performing these operations. This apparatus may be specially constructed for the required purposes, or it may be a general-purpose computer and/or computer system selectively activated or reconfigured by a computer program and/or data structure stored in a computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 6:
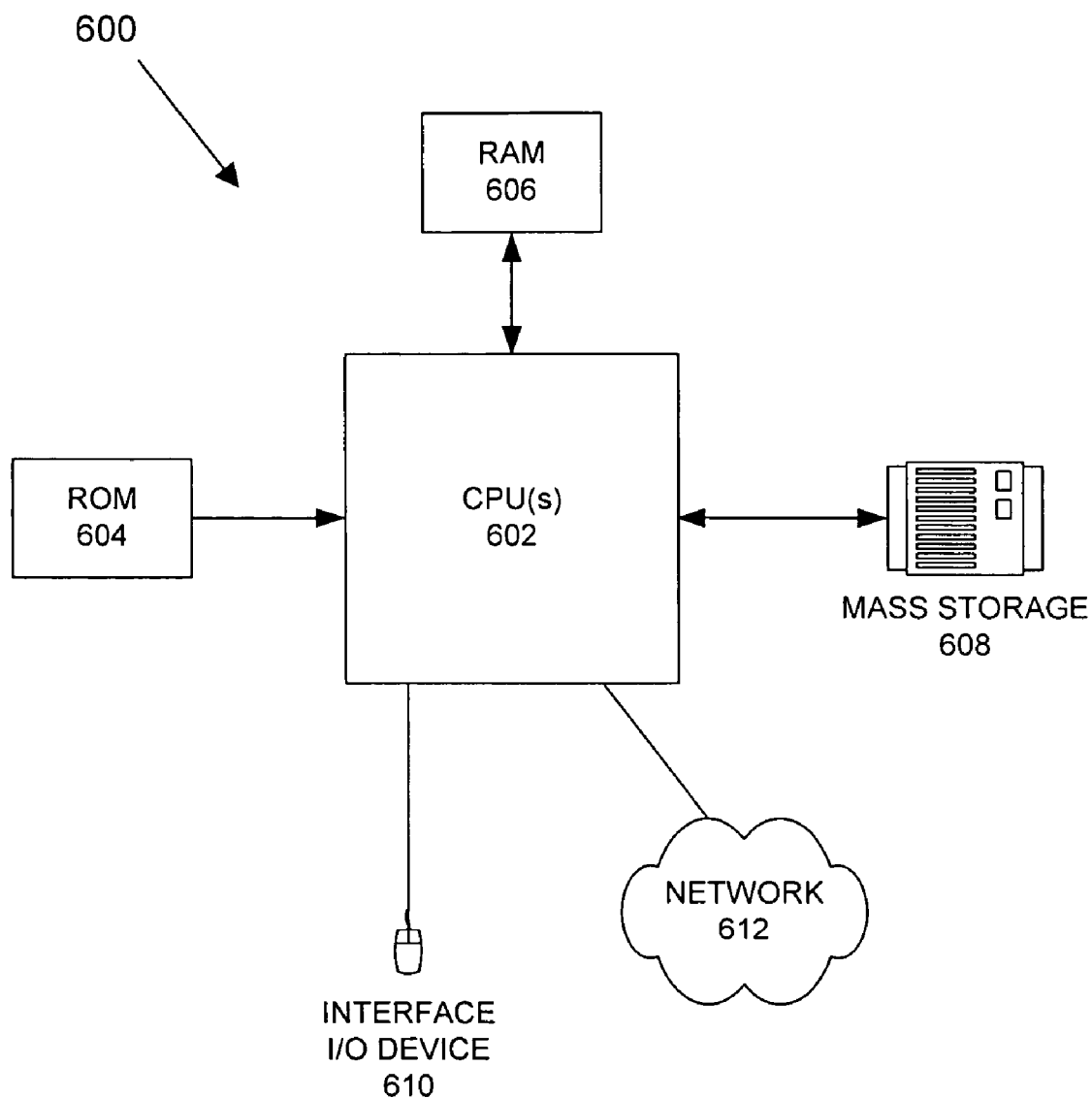
FIG. 6 is a block diagram of a typical computer system or integrated circuit system suitable for implementing embodiments of the present invention.

FIG. 6 illustrates a typical computer system that can be used by a user and/or controller in accordance with one or more embodiments of the present invention. The computer system 600 includes any number of processors 602 (also referred to as central processing units, or CPUS) that are coupled to storage devices including primary storage 606 (typically a random access memory, or RAM), primary storage 604 (typically a read only memory, or ROM). As is well known in the art, primary storage 604 acts to transfer data and instructions uni-directionally to the CPU and primary storage 606 is used typically to transfer data and instructions in a bi-directional manner. Both of these primary storage devices may include any suitable of the computer-readable media described above. A mass storage device 608 also is coupled bi-directionally to CPU 602 and provides additional data storage capacity and may include any of the computer-readable media described above. The mass storage device 608 may be used to store programs, data and the like and is typically a secondary storage medium such as a hard disk that is slower than primary storage. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 also is coupled to an interface 610 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to a computer or telecommunications network using a network connection as shown generally at 612. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 608 or 614 and executed on CPU 602 in conjunction with primary memory 606. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method of adding a new DSL line set to an already-operating DSL line set, the method comprising:
   collecting operational data, via a data collection unit, from the new DSL line set and the already-operating DSL line set;
   performing, via an analysis unit coupled to the collection unit, the following operations:
      analyzing the collected operational data;
      determining an operational configuration for at least one DSL line in the new DSL line set that will allow the new DSL line set to join the already-operating DSL line set without disrupting the already-operating DSL line set;
      evaluating data received by the new DSL line set; and
      evaluating data received by the already-operating DSL line set; and
   sending control signals, via a control signal generator coupled to the analysis unit, to the new DSL line set and to the already-operating DSL line set, further wherein the control signals comprise signals controlling operation of at least one of the following:
      the new DSL line set; or
      the already-operating DSL line set; and
   wherein the controller is configured to evaluate whether crosstalk from the new DSL line set affects the already-operating DSL line set.

2. The method of claim 1 wherein the controller is configured to evaluate whether crosstalk from the new DSL line set affects the already-operating DSL line set by measuring crosstalk levels resulting from transmitting data using the at least one DSL line in the new DSL line set and the already-operating DSL line set concurrently.

3. The method of claim 1 wherein the already-operating DSL line set comprises at least one of the following:
   a vectored DSL line set; a single DSL line; or
   a plurality of DSL lines; and further wherein the new DSL line set comprises:
      a single DSL line; or
      a plurality of DSL lines.

4. The method of claim 1 further comprising configuring operation of the already-operating DSL line set to prevent disruption of the already-operating DSL line set by the new DSL line set, wherein configuring operation of the already-operating DSL line set is performed either:
   before transmitting data using the at least one DSL line in the new DSL line set and the already-operating DSL line set concurrently; or
   after evaluating concurrent use of the new DSL line set and the already-operating DSL line set.

5. The method of claim 1 wherein determining the operational configuration for the at least one DSL line in the new DSL line set comprises using orthogonal training sequences on a plurality of DSL lines in the new DSL line set to permit independent identification of the plurality of DSL lines in the new DSL line set during simultaneous training.

6. The method of claim 1 wherein determining the operational configuration for the at least one DSL line in the new DSL line set comprises setting at least one transmit power level of the at least one DSL line in the new DSL line set to prevent disruptive crosstalk in the already-operating DSL line set.

7. The method of claim 6 wherein setting the at least one transmit power level of the at least one DSL line in new DSL line set to prevent disruptive crosstalk in the already-operating DSL line set comprises using at least one of the following to limit transmit power of the at least one DSL line in the new DSL line set:
CARMASK;
PSDMASK;
MAXNOMATP;
MAXNOMPSD;
MAXRXPWR;
RFIBANDS;
MAXSNRM;
BCAP[n];
Rmax;
upstream Power "Back-Off";
a carrier mask operational parameter;
a PSD operational parameter;
a data rate operational parameter;
a bit cap operational parameter; or
a margin operational parameter.

8. The method of claim 1 wherein determining the operational configuration for the at least one DSL line in the new DSL line set comprises limiting data transmission by the at least one DSL line in the new DSL line set to at least one tone set configured to prevent disruptive crosstalk in the already-operating DSL line set.

9. The method of claim 1 wherein the control signals sent to the new DSL line set and the already-operating DSL line set comprise signals controlling at least one of the following:
CARMASK;
PSDMASK;
RFIBANDS;
BCAP[n];
a carrier mask operational parameter;
a PSD operational parameter;
a bit cap operational parameter; or
a margin operational parameter.

10. The method of claim 1 wherein the already-operating DSL line set is a vectored DSL line set; further wherein the method further comprises adjusting operation of the vectored DSL line set to integrate the new DSL line set into vectored operation with the vectored DSL line set.

11. The method of claim 10 wherein adjusting operation of the vectored DSL line set to integrate the new DSL line set into vectored operation with the vectored DSL line set comprises:
obtaining vector channel and noise information for the new DSL line set and for the already-operating DSL line set; and
performing vectoring based on the obtained vector channel and noise information.

12. The method of claim 10 wherein adjusting operation of the vectored DSL line set to integrate the new DSL line set into vectored operation with the vectored DSL line set comprises configuring operation of the vectored DSL line set to integrate the new DSL line set into vectored operation with the vectored DSL line set after evaluating concurrent use of the new DSL line set and the already-operating DSL line set.

13. The method of claim 10 wherein adjusting operation of the vectored DSL line set to integrate the new DSL line set into vectored operation with the vectored DSL line set comprises configuring operation of the new DSL line set to integrate the new DSL line set into vectored operation with the vectored DSL line set after evaluating concurrent use of the new DSL line set and the already-operating DSL line set.

14. A controller comprising:
a data collection unit configured to collect operational data from a new DSL line set and an already-operating DSL line set;
an analysis unit coupled to the collection unit, wherein the analysis unit is configured to:
analyze the collected operational data;
determine an operational configuration for at least one DSL line in the new DSL line set that will allow the new DSL line set to join the already-operating DSL line set without disrupting the already-operating DSL line set;
evaluate data received by the new DSL line set; and
evaluate data received by the already-operating DSL line set; and
a control signal generator coupled to the analysis unit, wherein the control signal generator is configured to send control signals to the new DSL line set and to the already-operating DSL line set, further wherein the control signals comprise signals controlling operation of at least one of the following:
the new DSL line set; or
the already-operating DSL line set; and wherein the controller is configured to evaluate whether crosstalk from the new DSL line set affects the already-operating DSL line set.

15. The controller of claim 14 wherein the operational configuration for the at least one DSL line in the new DSL line set comprises setting transmit power for the at least one DSL line in the new DSL line set.

16. The controller of claim 14 wherein the controller is configured to obtain vector channel and noise information for the new DSL line set and the already-operating DSL line set.

17. The controller of claim 14 wherein the already-operating DSL line set comprises at least one of the following:
is a vectored DSL line set;
a single DSL line; or
a plurality of DSL lines.

18. The controller of claim 14 wherein the operational configuration for at least one DSL line in the new DSL line set comprises orthogonal training sequences on a plurality of DSL lines in the new DSL line set to permit independent identification of the plurality of DSL lines in the new DSL line set during simultaneous training.

19. The controller of claim 14 wherein the control signals sent to the new DSL line set and the already-operating DSL line set comprise signals controlling at least one of the following:
CARMASK;
PSDMASK;
RFIBANDS;
BCAP[n];
a carrier mask operational parameter;
a PSD operational parameter;
a bit cap operational parameter; or
a margin operational parameter.

20. A computer program product comprising:
a machine readable medium; and
program instructions contained in the machine readable medium, the program instructions specifying a method of training a new DSL line set to join an already-operating DSL line set, the method comprising:
collecting operational data, via a data collection unit, from the new DSL line set and the already-operating DSL line set;
performing the following operations, via an analysis unit coupled to the collection unit:

analyzing the collected operational data
determining an operational configuration for at least one DSL line in the new DSL line set that will allow the new DSL line set to join the already-operating DSL line set without disrupting the already-operating DSL line set;
evaluating data received by the new DSL line set; and
evaluating data received by the already-operating DSL line set; and
sending control signals, via a control signal generator coupled to the analysis unit, to the new DSL line set and to the already-operating DSL line set, further wherein the control signals comprise signals controlling operation of at least one of the following:
the new DSL line set; or
the already-operating DSL line set; and
wherein the controller is configured to evaluate whether crosstalk from the new DSL line set affects the already-operating DSL line set.

* * * * *